US010165449B2

(12) United States Patent
Bini et al.

(10) Patent No.: US 10,165,449 B2
(45) Date of Patent: Dec. 25, 2018

(54) METHOD OF PLANNING OF MOBILE TELECOMMUNICATIONS NETWORKS

(71) Applicant: TELECOM ITALIA S.p.A., Milan (IT)

(72) Inventors: Graziano Bini, Rome (IT); Francesco Epifani, Turin (IT); Michele Ludovico, Turin (IT); Giuseppe Minerva, Turin (IT); Daniela Mirra, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/574,636

(22) PCT Filed: May 28, 2015

(86) PCT No.: PCT/EP2015/061825
§ 371 (c)(1),
(2) Date: Nov. 16, 2017

(87) PCT Pub. No.: WO2016/188580
PCT Pub. Date: Dec. 1, 2016

(65) Prior Publication Data
US 2018/0295521 A1 Oct. 11, 2018

(51) Int. Cl.
*H04W 16/12* (2009.01)
*H04W 16/18* (2009.01)
*H04W 16/22* (2009.01)

(52) U.S. Cl.
CPC ........... *H04W 16/12* (2013.01); *H04W 16/18* (2013.01); *H04W 16/22* (2013.01)

(58) Field of Classification Search
CPC ..... H04W 16/02; H04W 16/18; H04W 16/12; H04W 16/22
See application file for complete search history.

(56) References Cited

U.S. PATENT DOCUMENTS 8,594,685 B2 * 11/2013 Kronestedt ............ H04L 5/001
370/329
2006/0009226 A1 * 1/2006 Vicharelli ............ H04W 16/18
455/450

(Continued)

OTHER PUBLICATIONS

International Search Report dated Feb. 26, 2016 in PCT/EP2015/061825 filed May 28, 2015.

(Continued)

*Primary Examiner* — Nam T Huynh
(74) *Attorney, Agent, or Firm* — Oblon, McClelland, Maier & Neustadt, L.L.P.

(57) ABSTRACT

A method of assigning radio frequencies to base stations (105-1) of a first radio telecommunications network operating in a first radio frequency band and co-existing with at least a second radio telecommunications network (110, 110-1; 115, 115-1) operating in a second radio frequency band at least partially overlapping the first radio frequency band. The method comprises: simulations of electromagnetic field propagation; defining a cost function for quantitatively evaluating a radio frequency assignment plan for the base stations of the first radio telecommunications network; calculating an initial radio frequencies assignment plan for the base stations of the first radio telecommunications network; calculating at least one alternative radio frequency assignment plan starting from the initial radio frequency assignment plan; selecting as radio frequency assignment plan for the base stations of the first radio telecommunications network one of the alternative radio frequency assignment plans based on the values of the cost function, and assigning to the base stations (105-1) of the first radio telecommunications network frequencies in accordance with the radio frequency assignment plan selected.

13 Claims, 4 Drawing Sheets

(56) References Cited

U.S. PATENT DOCUMENTS

2008/0107097 A1* 5/2008 Houze ............... H04W 16/18
370/343
2010/0317354 A1* 12/2010 Kirvar ............... H04W 16/18
455/447

OTHER PUBLICATIONS

Written Opinion dated Feb. 26, 2016 in PCT/EP2015/061825 filed May 28, 2015.
Karen I. Aardal, et al., "Models and solution techniques for frequency assignment problems" Annals of Operations Research, vol. 153, XP019497333, 2007, pp. 79-129.

* cited by examiner

METHOD OF PLANNING OF MOBILE TELECOMMUNICATIONS NETWORKS

BACKGROUND OF THE INVENTION

Technical Field

The present invention relates in general to the field of telecommunications and telecommunications networks, and particularly to mobile radio telecommunications networks like mobile (cellular) telephony networks. More specifically, the invention deals with the aspects of planning and designing mobile telecommunications networks for the assignment of radio frequencies to the base stations of the cellular networks.

Overview of the Related Art

Nowadays (and in the foreseeable future), radio telecommunications networks based on different (radio access) technologies (e.g., different standards) coexist (and will coexist) on the field.

For example, second-generation ("2G") cellular networks, e.g. GSM (acronym for Global System for Mobile communications) networks operating in the 900 MHz frequency band and GSM networks operating in the 1800 MHz frequency band (the latter being also known as GSM-DCS, an acronym for Digital Cellular Service) co-exist in (a) same frequency band(s) with other cellular networks based on different radio access technologies afferent to IMT-2000/IMT Advanced (acronym for International Mobile Telecommunications) standards, e.g. UMTS/HSDPA (Universal Mobile Telecommunication Standard/High Speed Downlink Packet Access) cellular networks and LTE/LTE-A (Long Term Evolution/LTE—Advanced) cellular networks.

The co-existence of radio telecommunications networks based on different (radio access) technologies raises issues in the assignment of radio frequencies to the different networks, due to inherent problems of interference. In the exemplary scenario of co-existence just mentioned, the co-existence of 2G (GSM and GSM-DCS) networks with IMT-2000/IMT Advanced cellular networks raises issues in the assignment of radio frequencies to the base stations of the 2G networks.

Up to now, the issue related to the interferential co-existence of radio telecommunications networks based on different (radio access) technologies (e.g., different standards, as mentioned above) has been regarded mainly as a hardware-related problem, and thus essentially related to the technology, design and development of network transceivers (antenna apparatuses, radio-frequency filters, combiners etc.).

In Lata Narayanan and Sunil M. Shendey, "Static Frequency Assignment in Cellular", Algorithmica Journal, 1998, a cellular network is modeled as a subgraph of the triangular lattice. In the static frequency assignment problem, each vertex of the graph is a base station in the network, and has associated with it an integer weight that represents the number of calls that must be served at the vertex by assigning distinct frequencies per call. The edges of the graph model interference constraints for frequencies assigned to neighboring stations. The static frequency assignment problem can be abstracted as a graph multicoloring problem. The authors describe an algorithm to optimally multicolor any weighted even or odd length cycle representing a cellular network.

In Sanguthevar Rajasekaran, K. Naik and David Wei, "On Frequency Assignment in Cellular Networks", Proceedings DIMACS Workshop on Mobile Networks and Computing, Rutgers University, Piscataway, N.J., 1999, the authors consider the problem of frequency assignment in cellular networks. The model considered is general, and an algorithm for frequency assignment is presented.

In Wun-Tat Chan, Francis Y. L. Chin, Deshi Ye, Yong Zhang and Hong Zhu, "Greedy Online Frequency Allocation in Cellular Networks", Information Processing Letters, Volume 102, Issues 2-3, 30 Apr. 2007, pages 55-61, the authors study the greedy approach for the online frequency allocation problem, which assigns the minimal available frequency to a new call so that the call does not interfere with calls of the same cell or neighboring cells.

SUMMARY OF THE INVENTION

The Applicant has tackled the problem of planning/designing mobile telecommunications networks, and particularly assigning radio frequencies thereto (i.e., to the base stations of the networks), in scenarios of co-existence of different radio mobile telecommunications networks, i.e. radio mobile telecommunications networks based on different radio access technologies, which exploit same or overlapping radio frequency bands.

The Applicant has noticed that, by considering the issue of the interferential co-existence of different radio mobile telecommunications networks from the viewpoint of the network planning, instead of just as a hardware-related problem as done up to now, the problem to be tackled becomes one of defining a proper radio frequency plan for one or more of the co-existing different mobile telecommunications networks, for example a 2G network like a 900 MHz GSM network or a 1800 MHz GSM-DCS network, taking into account the co-existence of such 2G network with different radio mobile telecommunications networks, based on different radio access technologies, e.g. UMTS/HSDPA operating at 900 MHz or LTE or LTE-A operating at 1800 MHz.

According to the present invention, there is proposed a method of coping with the problem of the interferential co-existence of a group of different radio mobile telecommunications networks by taking into account the interference levels in the group of different radio mobile telecommunications networks under planning and/or being analysed as a whole, that means, by taking into account the interference caused by, e.g., UMTS/HSDPA or LTE/LTE-A networks (hereinafter also referred to as a whole as "extra-2G networks") to, e.g., 2G networks, and vice versa.

Also, the method of the present invention allows taking into account possible radio frequency constraints that limit the radio frequencies that can be assigned to a given cell of a 2G network due to the co-existence of cells of networks based on radio access technologies afferent to IMT-2000 or IMT Advanced standards (like LTE and LTE-A). An example of such radio frequency constraints are, in GSM and GSM-DCS networks, the constraints limiting the choice of the possible values that can be assigned to the ARFCN—Absolute Radio-Frequency Channel Number—a code that specifies a pair of physical radio carriers used for transmission and reception in a land mobile radio system, one for the uplink signal and one for the downlink signal.

In particular, according to the present invention there is proposed a method to define an objective function (cost function), to be used in order to lead the frequency assignment procedure (based on Operational Research concepts) towards a satisfying 2G frequency plan definition.

In an aspect thereof, the present invention provides a method of assigning radio frequencies to base stations of a first radio telecommunications network operating in a first radio frequency band and co-existing with at least a second radio telecommunications network operating in a second radio frequency band at least partially overlapping the first radio frequency band. The method comprises:

1—providing:

a) a description of the mutual interference of the base stations of the first radio telecommunications network;

b) a description of the interference caused by the second radio telecommunications network to the base stations of the first radio telecommunications network;

c) a description of the interference caused by the base stations of the first radio telecommunications network to the second radio telecommunications network;

d) a description of the mutual interference of base stations of the second radio telecommunications network, wherein said providing a), b), c) and d) is based on simulations of electromagnetic field propagation;

2—defining a cost function for quantitatively evaluating a radio frequency assignment plan for the base stations of the first radio telecommunications network;

3—based on the provided descriptions a), b), c) and d), calculating an initial radio frequencies assignment plan for the base stations of the first radio telecommunications network;

4—calculating at least one alternative radio frequency assignment plan starting from the initial radio frequency assignment plan;

5—calculating a value of the cost function for the alternative radio frequency assignment plan;

6—selecting as radio frequency assignment plan for the base stations of the first radio telecommunications network one of the alternative radio frequency assignment plans based on the values of the cost function, and 7—assigning to the base stations (105-1) of the first radio telecommunications network frequencies in accordance with the radio frequency assignment plan selected in step 6.

Said providing: a) a description of the mutual interference of the base stations of the first radio telecommunications network may comprise providing a description in the form of a matrix whose generic matrix element is indicative of a ratio of the useful signal to the interfering signal associated with a carrier of the i-th base station of the first radio telecommunications network when a co-channel frequency is assigned to a carrier of the j-th base station of the first radio telecommunications network.

Said providing b) a description of the interference caused by the second radio telecommunications network to the base stations of the first radio telecommunications network may comprise providing a description in the form of an array whose generic array element is indicative of a ratio of the useful signal to the interfering signal associated with a carrier of the h-th base station of the first radio telecommunications network due to the second radio telecommunications network as a whole.

Said providing c) a description of the interference caused by the base stations of the first radio telecommunications network to the second radio telecommunications network may comprise providing a description in the form of a matrix whose generic matrix element is indicative of a ratio of the useful signal to the interfering signal associated with a m-th base station of the second radio telecommunications network due to a single carrier of the n-th base station of the first radio telecommunications network.

Said providing d) a description of the mutual interference of base stations of the second radio telecommunications network may comprise providing a description in the form of an array whose generic array element is indicative of a ratio of the useful signal to the interfering signal associated with the k-th base station of the second radio telecommunications network due to the whole second radio telecommunications network.

The second radio telecommunications network may in particular be a wide-band carrier network.

Said cost function may be defined as a weighted combination of two or more sub-functions, particularly a first sub-function related to interferential conditions, a second sub-function related to an interfered traffic, a third sub-function related to frequency reuse constraints and a fourth sub-function related to a channel group configuration.

The first sub-function related to interferential conditions may take account of a number of carriers of the second radio telecommunications network that, based on said description of the interference caused by the base stations of the first radio telecommunications network to the second radio telecommunications network, are below a predefined threshold of ratio of useful signal to total interfering signal.

Said calculating an initial radio frequencies assignment plan for the base stations of the first radio telecommunications network may comprise trying to find a radio frequencies assignment plan that fulfils radio frequency reuse constraints and radio frequency hopping channel group constraints.

Said calculating an initial radio frequencies assignment plan for the base stations of the first radio telecommunications network may comprise, in case a radio frequencies assignment plan that fulfils radio frequency reuse constraints and radio frequency hopping channel group constraints can not be found, calculating a radio frequencies assignment plan for the base stations of the first radio telecommunications network with relaxed radio frequency reuse constraints and radio frequency hopping channel group constraints.

Said steps 4 and 5 may comprise calculating a plurality of alternative radio frequencies assignment plans and calculating a value of the cost function for each alternative radio frequency assignment plan of said plurality, and selecting one among said plurality of alternative radio frequency assignment plan as a candidate radio frequency assignment plan based on the respective value of the cost function.

The method may comprise repeating at least once steps 4, 5 and 6, wherein, for the first and subsequent repetitions, the selected radio frequency assignment plan selected in step 7 of the preceding execution of steps 4-6 is taken as initial radio frequency assignment plan.

In another aspect thereof, the present invention provides a system configured for carrying out the method of the above aspect of the invention.

Thanks to the present invention, it is possible to take into account, in a simple and effective way, the interference levels induced by each mobile network on the other, co-existing mobile network(s). In this way, it is possible to properly define a frequency plan of the 2G mobile network that is suitable to both ensure a satisfactory level of interference experienced by the 2G, e.g. GSM or GSM-DCS network cells under planning, and to avoid an unacceptable worsening of the interference conditions of the cells of the other, extra-2G (e.g., UMTS/HSDPA and/or LTE/LTE-A) networks which, very often, exploit a substantial portion of the bandwidth available for the 2G network (since UMTS/

HSDPA and LTE/LTE-A technologies adopt spread-spectrum channels, with spectral width equal or greater than 5 MHz).

The Applicant believes that a significant improvement to the planning of 2G networks in scenarios of co-existence with extra-2G networks is the possibility of taking into account the interference condition of each cell of a 2G network and of the interfering/interfered cells of extra-2G networks (e.g., 900 MHz UMTS/HSDPA networks or 1800 MHz LTE/LTE-A networks, but also other systems, e.g. WiFi, can be taken into account if needed), evaluating a suitable ratio of useful signal to the set of interfering signals both on the basis of a single 2G network carrier (with an associated specific ARFCN) and on the basis of cells belonging to networks based on IMT-2000/IMT Advanced standards, estimating the increase/decrease of such a ratio in the planning phase.

BRIEF DESCRIPTION OF THE DRAWINGS

These and other features and advantages of the present invention will more clearly appear by the reading of the following detailed description of exemplary and non-limitative embodiments thereof, description that, for its better intelligibility, should be read in conjunction to the attached drawings, wherein.

DETAILED DESCRIPTION OF EXEMPLARY EMBODIMENTS OF THE PRESENT INVENTION

As discussed in the foregoing, the present invention deals with the planning and design of cellular mobile telecommunications networks, and particularly the present invention deals with the problem of the assignment of frequencies in 2G systems (like the 900 MHz GSM or the 1800 MHz GSM-DCS) that, in a certain geographic area, co-exist in a same frequency band, or in at least partially overlapping frequency bands, with different cellular mobile network systems, based on different radio access technologies, e.g. cellular mobile networks afferent to IMT-2000 or IMT-Advanced standards, such as UMTS/HSDPA system and/or LTE/LTE-A system.

More generally, the present invention proposes a solution to the problem of controlling and reducing (minimizing) the interference experienced in 2G, IMT-2000 and/or IMT-Advanced cellular mobile telecommunications networks that co-exist on, i.e. share, in part or fully, a same available radio frequency spectrum.

The present invention provides a method of general use that, when applied to the above-mentioned context of co-existing 2G and extra-2G networks, allows a network planner/designer evaluating the levels of interference that characterize the different cellular mobile telecommunications networks (or parts thereof) that are to be planned/designed. In particular, the method according to embodiments of the present invention allows calculating the interference associated with each carrier or cell of a cellular mobile telecommunications network, and is particularly useful in the phase of the planning/design process that calls for assigning frequencies to a 2G network. In addition to this, embodiments of the present invention provide an objective function (cost function), capable to lead the radio frequency assignment procedure to the definition of a satisfying 2G frequency plan, taking into account both the interferential conditions of the 2G and extra-2G networks and other aspects (e.g. frequency reuse constraints and/or interfered carried traffic and/or frequency hopping channel group configuration) that must be considered in order to define in an efficient way the final frequency plan.

Figure 1:
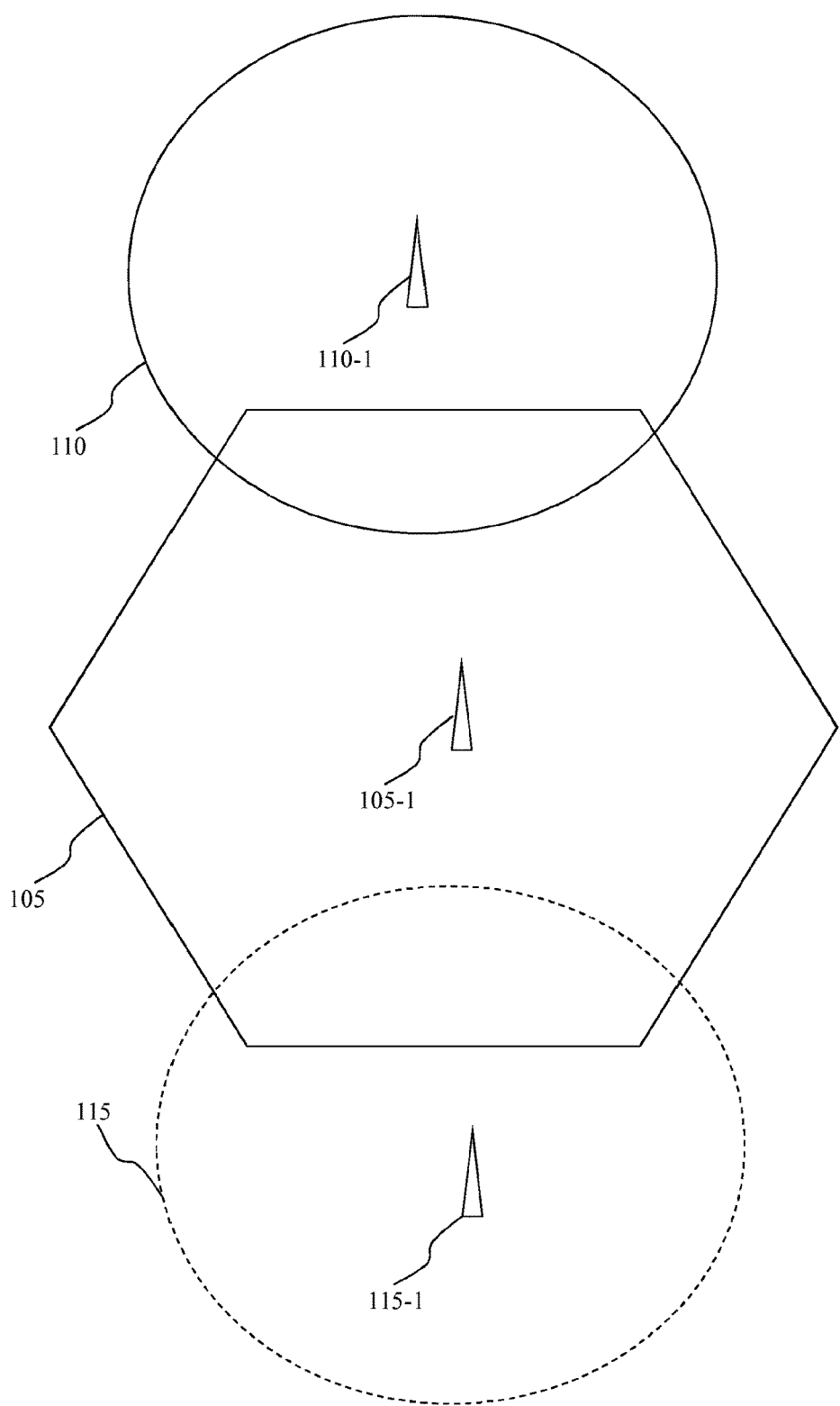
FIG. 1 pictorially shows a scenario of co-existence of a 2G cellular network and extra-2G cellular networks like a UMTS/HSDPA network and an LTE/LTE-A network.

Making reference to FIG. 1, there is pictorially shown a scenario of different cellular mobile telecommunications networks that co-exist in a certain geographic area. For example, the co-existing networks are a 2G network like a 900 MHz GSM network and/or a 1800 MHz GSM-DCS network, co-existing with an extra-2G network like a 900 MHz UMTS/HSDPA network and/or an LTE/LTE-A 1800 MHz network.

In FIG. 1, reference 105 denotes a generic cell of the 2G network, and reference 105-1 denotes the corresponding radio base station of the 2G network, e.g. a BTS (Base Transceiver Stations). Reference 110 denotes a generic cell of the extra-2G network operating at 900 MHz, and reference 110-1 denotes the respective radio base station, e.g. a Node-B. Reference 115 denotes a generic cell of the extra-2G network operating at 1800 MHz, and reference 115-1 denotes the radio base station thereof, e.g. an eNode-B.

The cells 110 and 115 are depicted as partially overlapping the cell 105 to graphically represent the interferential condition experimented by the different co-existing networks.

In a manner per se known, the radio base stations 105-1, 110-1, 115-1 include receiver filters (e.g., band-pass filters for filtering out signals falling out of the spectral band specific of the respective radio access technologies).

Indeed, in a real-life scenario each of the different networks (e.g. 900 MHz GSM, 1800 MHz GSM-DCS, 900 MHz UMTS/HSDPA and 1800 MHz LTE/LTE-A) comprises more than one cell, and a generic cell of any one of the different networks may experience interference due to one or more cells belonging to its same network or to another network using the same frequency band.

A method according to an embodiment of the present invention can be implemented totally in software, partly in software and partly in hardware, or totally in hardware. For example, the method according to an embodiment of the present invention can be implemented by a properly programmed computer or system of computers, possibly geographically distributed.

A method according to an embodiment of the present invention exploits as inputs a series of input data, for example the input data listed herebelow:

input data exploited for the interferential description of the cellular mobile telecommunications networks involved in the planning/design process, in the example here considered a 2G GSM network and a UMTS/HSDPA network both operating in the 900 MHz frequency band, or a 2G GSM-DCS network and a LTE/LTE-A network both operating in the 1800 MHz frequency band;

input data used for describing the actual characteristics of a receiver filter exploited by a receiver of the radio base stations of the 2G networks (BTSs) co-existing with the extra-2G network based on IMT-2000/IMT-Advanced standards (e.g. an UMTS/HSDPA network or LTE/ LTE-A network);

input data used for describing the actual characteristics of a receiver filter exploited by a receiver of the radio base stations of the extra-2G network based on IMT-2000/ IMT-Advanced standards (Node-Bs for an UMTS/HS-DPA network or eNode-Bs for an LTE/LTE-A network) co-existing with the 2G networks;

input data used for describing the attenuation of the interference experienced by a single 2G network carrier due to the assignment, to a generic cell of the 2G network, of an adjacent frequency in the frequency band;

input data used to evaluate an objective function used to lead the frequency assignment algorithm (based on Operational Research concepts) towards a satisfying 2G frequency plan definition, taking into account different aspects like interferential conditions, frequency reuse constraints, interfered carried traffic and frequency hopping channel group configuration.

According to an embodiment of the present invention, specific algorithms are developed that are dedicated to:

the computation of the interference experienced by a single carrier of a 2G network cell due to the interference contributions deriving from the 2G network as a whole;

the computation of the interference experienced by a single carrier of a 2G network cell due to interference contribution deriving from the extra-2G networks as a whole;

the computation of the total interference experienced by a single carrier of a 2G network cell due to the co-existence of the 2G network with an extra-2G network;

the computation of the interference experienced by a single cell (or wide-band carrier) of an extra-2G network due to the interference contributions deriving from the extra-2G networks as a whole;

the computation of the interference experienced by a single cell of an extra-2G network due to the 2G network;

the computation of the total interference experienced by a single cell of an extra-2G network due to the co-existence of such extra-2G network with the 2G network, and the computation of the objective function taking into account some key performance indicators of a frequency plan (interferential conditions, frequency reuse constraints, interfered carried traffic, frequency hopping channel group configuration).

The context outlined above is referred to interferential information related only to downlink section (the input data listed above relate to cell versus cell interferential conditions or whole network versus cell interferential conditions: cell versus cell input data describe the potential intra-2G network interference and, separately, the potential interference caused by each 2G network cell to each extra-2G network cell, whereas whole network versus cell input data describe the potential interference caused by the extra-2G network to each 2G network cell and, separately, the intra-extra-2G network potential interference) but the method according to the present invention can be used also if a similar description of the uplink section is available or when a coupled downlink/uplink description can be built and used.

In greater detail, the input data listed above (obtained using models devoted to the evaluation of radio coverage, described for example in WO 2005/076646 and WO 2012/089268) include the following data (hereinafter, the term "Other" is used to denote extra-2G cellular mobile networks, different from the 2G network, i.e. the networks based on IMT-2000/IMT Advanced standards. The arrow "←" is used to denote the interference experienced by a cellular mobile network indicated at the left of the arrow due to a cellular mobile network indicated at the right of the arrow).

—2G←2G Interference Matrix:

$$M_{1,1}^{2G \leftarrow 2G} = \begin{bmatrix} c_{1,1}^{2G \leftarrow 2G} & c_{1,2}^{2G \leftarrow 2G} & \cdots & c_{1,N_{2G}}^{2G \leftarrow 2G} \\ c_{2,1}^{2G \leftarrow 2G} & \cdots & \cdots & \cdots \\ \cdots & \cdots & c_{i,j}^{2G \leftarrow 2G} & \cdots \\ c_{N_{2G},1}^{2G \leftarrow 2G} & \cdots & \cdots & c_{N_{2G},N_{2G}}^{2G \leftarrow 2G} \end{bmatrix} \quad [1]$$

The generic (i,j)-th element $c_{i,j}^{2G \leftarrow 2G}$ of the 2G←2G interference matrix [1] corresponds to the ratio of the useful signal to the interfering signal associated with a carrier of the i-th cell of the 2G network when a co-channel frequency is assigned to a carrier of the j-th cell of the 2G network.

—Other←Other Interference Array:

$$\frac{S_u}{I_i}^{Other \leftarrow Other} = [(S_u/I_i)_1^{Other \leftarrow Other}, (S_u/I_i)_2^{Other \leftarrow Other}, \quad [2]$$
$$\ldots, (S_u/I_i)_k^{Other \leftarrow Other}, \ldots, (S_u/I_i)_{N_{Other}}^{Other \leftarrow Other}]$$

The k-th element $(S_u/I_i)_k^{Other \leftarrow Other}$ of the Other←Other interference array [2] corresponds to the ratio of the useful signal to the interfering signal associated with the k-th cell (or wide-band carrier) of the extra-2G network due to the whole respective extra-2G network.

—Other←2G Interference Matrix:

$$M^{Other \leftarrow 2G} = \begin{bmatrix} c_{1,1}^{Other \leftarrow 2G} & c_{1,2}^{Other \leftarrow 2G} & \cdots & c_{1,N_{2G}}^{Other \leftarrow 2G} \\ c_{2,1}^{Other \leftarrow 2G} & c_{2,2}^{Other \leftarrow 2G} & \cdots & \cdots \\ \cdots & \cdots & c_{m,n}^{Other \leftarrow 2G} & \cdots \\ c_{N_{Other},1}^{Other \leftarrow 2G} & \cdots & \cdots & c_{N_{Other},N_{2G}}^{Other \leftarrow 2G} \end{bmatrix} \quad [3]$$

The (m,n)-th element $c_{m,n}^{Other \leftarrow 2G}$ of the Other←2G interference matrix [3] corresponds to the ratio of the useful signal to the interfering signal (in absence of attenuation of the receiver filter) associated with the m-th cell (or wideband carrier) of the extra-2G network due to a single carrier of the n-th cell of the 2G network to which the central frequency of the wide-band carrier is assigned (at least 5 MHz of bandwidth for the UMTS/HSDPA or LTE/LTE-A networks).

—2G←Other Interference Array:

$$\left.\frac{C}{I}\right|^{2G \leftarrow Other} = [(C/I)_1^{2G \leftarrow Other}, (C/I)_2^{2G \leftarrow Other}, \quad [4]$$
$$\ldots, (C/I)_h^{2G \leftarrow Other}, \ldots, (C/I)_{N_{2G}}^{2G \leftarrow Other}]$$

The h-th element $(C/I)_h^{2G \leftarrow Other}$ of the 2G←Other interference array [4] corresponds to the ratio of the useful signal to the interfering signal (in absence of attenuation of the receiver filter) associated with a carrier of the h-th cell of the 2G network to which the central frequency of a wide-band carrier is assigned and due to the extra-2G network as a whole.

—Other←2G Interference Attenuation Array:

$$Att^{Other\leftarrow 2G}=[Att_{F_1}^{Other\leftarrow 2G},Att_{F_2}^{Other\leftarrow 2G},\ldots,$$
$$Att_{F_s}^{Other\leftarrow 2G},\ldots,Att_{F_{Nf}}^{Other\leftarrow 2G}] \quad [5]$$

The $F_s$-th element $Att_{F_s}^{Other\leftarrow 2G}$ of the Other←2G interference attenuation array [5] corresponds to the attenuation factor to be applied to the (m,n)-th element of the Other←2G interference matrix [3], in case the s-th frequency of the GSM or GSM-DCS network is assigned to a carrier of the n-th cell of the 2G network, in order to correctly compute the ratio of the useful signal to the interfering signal of the m-th cell of the extra-2G network.

—2G Other Interference Attenuation Array:

$$Att^{2G\leftarrow Other}=[Att_{F_1}^{2G\leftarrow Other},Att_{F_2}^{2G\leftarrow Other},\ldots,$$
$$Att_{F_s}^{2G\leftarrow Other},\ldots,Att_{F_{Nf}}^{2G\leftarrow Other}] \quad [6]$$

The $F_s$-th element $Att_{F_s}^{2G\leftarrow Other}$ of the 2G←Other interference attenuation array [6] corresponds to the attenuation factor to be applied to the h-th element of the 2G←Other interference array [4] in case the s-th frequency of the GSM or GSM-DCS network is assigned to a carrier of the h-th cell of the 2G network, in order to correctly calculate the ratio of the useful signal to the interfering signal due to the extra-2G network as a whole.

—2G←2G Interference Attenuation Coefficient Due to Adjacent Channel:

$$Att^{2G\leftarrow 2G} \quad [7]$$

The coefficient [7] corresponds to the attenuation factor to be applied to the (i,j)-th element $c_{i,j}^{2G\leftarrow 2G}$ of the 2G←2G interference matrix [1] in order to compute the ratio of the useful signal to the interfering signal associated with a carrier of the i-th 2G network cell in case an adjacent frequency in the bandwidth is assigned to a carrier of the j-th 2G network cell.

—Look-Up Table (C/I Carrier) Vs (Percentage of Interfered Traffic):

$$\varphi_{Tr\text{-}Intrf}^{\%}[\varphi_1^{\%},\varphi_2^{\%},\ldots,\varphi_i^{\%},\ldots,\varphi_{N_{interval}}^{\%}] \quad [8]$$

The i-th element $\varphi_i^{\%}$ of the look-up table [8], which may take values in the range [0,1], corresponds to the fraction of the traffic carried by a carrier of a GSM cell and interfered by the whole 2G and extra-2G networks when the ratio of the useful signal to the interfering signal associated to the ARFCN assigned to the carrier assumes a value belonging to the i-th interval.

—Set of Weights of the Objective Function:

$$W_{F_o}=[W_{int},W_{traff},W_{rc},W_{cgc}] \quad [9]$$

The objective function that is used to lead the assignment algorithm towards the optimization of the final frequency plan for the cells of the 2G network can be made up, i.e. be the combination of, two or more objective sub-functions, as described in the following. For example, the objective function can be a combination of objective sub-functions related to the interferential conditions, the interfered traffic, the frequency reuse constraints and the channel group configuration. The set of weights [9] of the objective function permits to weight in a different way the various objective sub-functions: weight $W_{int}$ weights the interferential conditions objective sub-function, weight $W_{traff}$ weights the interfered traffic objective sub-function, weight $W_{rc}$ weights the reuse constraints objective sub-function and weight $W_{cgc}$ weights the channel group configuration objective sub-function.

—Set of Weights of the Interferential Sub-Function:

$$w^{int}=[W_{int}^{npss,2G},W_{int}^{npss,extra\text{-}2G},W_{int}^{I/C\ avg},$$
$$W_{int}^{I/C\ max}] \quad [10]$$

The objective sub-functions that compose the objective function are made up, i.e. are the combination of, respective items or voices of cost, which are combined by individual weights. The set of weights [10] of the interferential objective sub-function permits to weight in a different way the voices of cost (i.e., key performance indicators) related to the average ratio of the interfering signal to the useful signal ($W_{int}^{I/C\ avg}$) evaluated considering all carriers of the frequency plan, the maximum ratio of the interfering signal to the useful signal ($W_{int}^{I/C\ max}$) associated with the worst carrier of the frequency plan and the number of carriers of the frequency plan characterised by a ratio of the useful signal to the interfering signal lesser than a predefined threshold (e.g. 9 dB).

—Set of Weights of the Relaxed Reuse Constraints Sub-Function:

$$W^{rc}=[W_{rc}^{cell},W_{rc}^{site},W_{rc}^{adj1},W_{rc}^{adj2}] \quad [11]$$

A frequency reuse constrain between a pair of cells A and B consists in the minimum distance within the available frequency band that an ARFCN "X" assigned to the cell A and an ARCFN "Y" assigned to the cell B must respect in order to obtained a well-defined frequency plan. The set of weights [11] permits to weight in a different way the voices of cost related to the sets of cell constraints ($W_{rc}^{cell}$), site constraints ($W_{rc}^{site}$), adjacency constraints with minimum distance equal to 1 ($W_{rc}^{adj1}$) and adjacency constraints with minimum distance equal to 2 ($W_{rc}^{adj2}$).

—Set of Weights of the Relaxed Channel Group Configuration Sub-Function:

$$W^{cgc}=[W_{cgc}^{0P},W_{cfc}^{1P},W_{cgc}^{2P}] \quad [12]$$

A relaxed channel group configuration consists in a set of assigned ARFCNs that does not permit an optimal implementation of the frequency hopping functionality. The set of weights [12] permits to weight in a different way the voices of cost related to different sub-optimal channel group configuration named 0P configuration ($W_{cgc}^{0P}$), 1P configuration ($W_{cgc}^{1P}$) and 2P configuration ($W_{cgc}^{2P}$).

Figure 2:
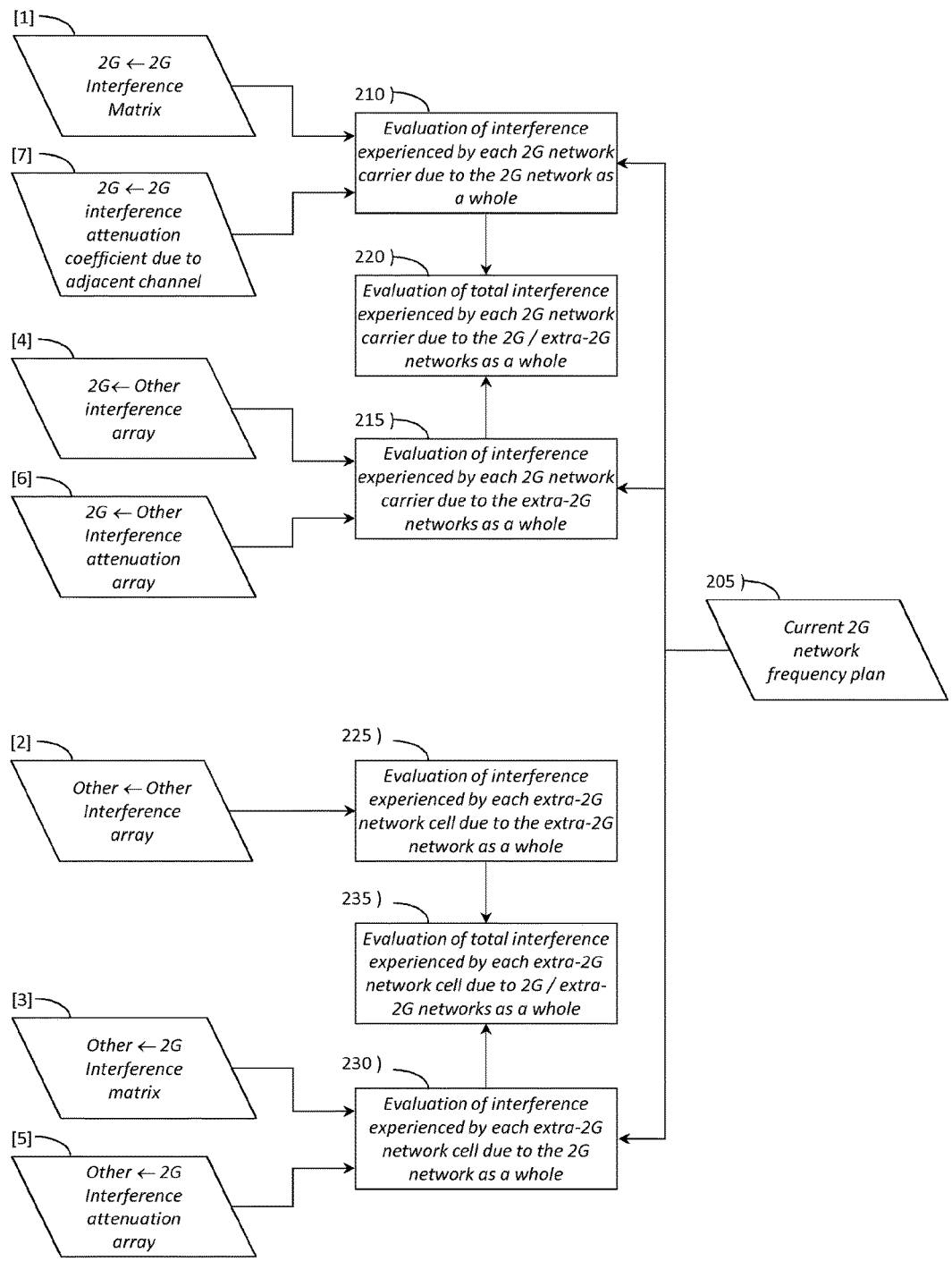
FIG. 2 is an activity flow diagram schematizing some actions of a method devoted to the interferential condition estimation according to an embodiment of the present invention.

Based on the input data [1] to [7] described above, the interferential conditions of the 2G networks (900 MHz GSM network or 1800 MHz GSM-DCS network, in the considered example) and of the extra-2G networks (900 MHz UMTS/HSDPA network or 1800 MHz LTE/LTE-A network, in the considered example, but also other system—e.g. WiFi—or other networks based on IMT-2000/IMT-Advanced standards can be taken into account) are evaluated as described herebelow, with reference to the actions flow diagram depicted in FIG. 2.

It is assumed that a current frequency plan 205 of the 2G network is available. The current frequency plan 205 is for example the 2G network frequency plan of the deployed 2G network already in operation, or a possible solution of the to-be-defined frequency plan of the 2G network being re-planned/optimized by an automatic frequency assignment algorithm, as described in the following. The knowledge of the current frequency plan 205 is exploited for the computations performed in the computation blocks 210, 215 and 230 described below.

As schematized by computation block 210, the interference experienced by each carrier of the 2G network (GSM or DCS) due to the 2G network as a whole ("intra-2G" interference) is evaluated, exploiting the 2G←2G interference matrix [1] and the 2G←2G interference attenuation coefficient due to adjacent channel [7]. The intra-2G interference experienced by a generic radio carrier of the 2G network can be computed as follows:

$$\left(\frac{I}{C}\right)_{i,F_s}^{2G \leftarrow 2G} = \sum_{j=1}^{N_{2G}} \sum_{l=1}^{P_j} I_{ij} \cdot x_{iF_s} \cdot A_{jF_s l} + \quad [13]$$

$$\sum_{j=1}^{N_{2G}} \sum_{l=1}^{P_j} I_{ij} \cdot x_{iF_s} \cdot \frac{A_{j(F_s+1)l}}{Att^{2G \leftarrow 2G}} + \sum_{j=1}^{N_{2G}} \sum_{l=1}^{P_j} I_{ij} \cdot x_{iF_s} \cdot \frac{A_{j(F_s-1)l}}{Att^{2G \leftarrow 2G}}$$

where:
- $p_j$ represents the number of radio carriers of the j-th interfering cell;
- $x_{iF_s}$ is equal to 1 if the frequency $F_s$ is assigned to a carrier of the i-th cell, otherwise it is equal to 0;
- $A_{jF_s l}$ is equal to 1 if the frequency $F_s$ is assigned to the l-th carrier of the j-th cell, otherwise it is equal to 0, and $$I_{ij} = \frac{1}{c_{ij}^{2G \leftarrow 2G}}$$

is the ratio I/C (Interference to Carrier ratio) of the interference induced by the j-th cell on the i-th cell in case of a co-channel assignment (see formula [1]).

It is pointed out that the formula [13] reflects an approximation of the proposed approach, aimed at simplifying the input data and reducing the computational complexity. The approximation, that consists in using the 2G←2G interference matrix [1], is highly efficient when a frequency plan has to be evaluated or defined, and descends from the fact that the area of a 2G cell interfered by other 2G cells changes considering different interfering cells. This depends on the different geographic position and/or azimuth orientation and/or transmitted power of each cell.

Similar considerations are valid also for the other matrices or arrays described in the following.

As schematized by computation block 215, the total interference experienced by each carrier of the 2G network (GSM or DCS) due to extra-2G networks (e.g. UMTS/HSDPA or LTE/LTE-A) as a whole is computed exploiting the 2G←Other interference array [4] and the 2G←Other interference attenuation array [6]. The interference experienced by a radio carrier of the 2G network due to the co-existence with an extra-2G network can be calculated as follows:

$$\left(\frac{I}{C}\right)_{i,F_s}^{2G \leftarrow Other} = \frac{1}{(C/I)_i^{2G \leftarrow Other}} \cdot \frac{1}{Att_{F_s}^{2G \leftarrow Other}} \quad [14]$$

where $x_{iF_s} = 1$.

As schematized by computation block 220, the total interference experienced by a carrier of the 2G (GSM or DCS) network due to the 2G and extra-2G networks as a whole can be computed by exploiting the interference values [13] and [14] previously calculated in computation blocks 210 and 215:

$$\left(\frac{I}{C}\right)_{i,F_s}^{TOT} = \left(\frac{I}{C}\right)_{i,F_s}^{2G \leftarrow 2G} + \left(\frac{I}{C}\right)_{i,F_s}^{2G \leftarrow Other} \quad [15]$$

As schematized by computation block 225, the total interference experienced by each cell (or wide-band carrier) of the extra-2G (e.g. UMTS/HSDPA or LTE/LTE-A) network due to the extra-2G networks can be computed exploiting the Other←Other interference array [2] as follows:

$$\left(\frac{I}{C}\right)_k^{Other \leftarrow Other} = \frac{1}{(S_u/I_i)_k^{Other \leftarrow Other}} \quad [16]$$

As schematized by computation block 230, the interference experienced by each cell (or wide-band carrier) of the extra-2G networks due to the 2G network as a whole can be computed, exploiting the Other←2G interference matrix [3] and the Other←2G interference attenuation array [5], as follows:

$$\left(\frac{I}{C}\right)_k^{Other \leftarrow 2G} = \sum_{n=1}^{N_{2G}} \sum_{l=1}^{p_n} \frac{1}{c_{k,n}^{Other \leftarrow 2G}} \cdot \frac{1}{Att_{F_s}^{Other \leftarrow 2G}} \cdot x_{nF_s(l)} \quad [17]$$

where:
- $p_n$ denotes the number of radio carriers of the n-th cell of the 2G (GSM or DCS) network, and
- $x_{nF_s(l)}$ is equal to 1 if the frequency $F_s$ is assigned to the l-th carrier of the n-th cell, otherwise $x_{nF_s(l)}$ is equal to 0.

Then, as schematized by computation block 235, the total interference experienced by each cell of the extra-2G network due to the 2G and extra-2G networks as a whole can be computed by exploiting the interference values [16] and [17] previously calculated in blocks 225 and 230:

$$\left(\frac{I}{C}\right)_k^{TOT} = \left(\frac{I}{C}\right)_k^{Other \leftarrow Other} + \left(\frac{I}{C}\right)_k^{Other \leftarrow 2G} \quad [18]$$

Figure 3:
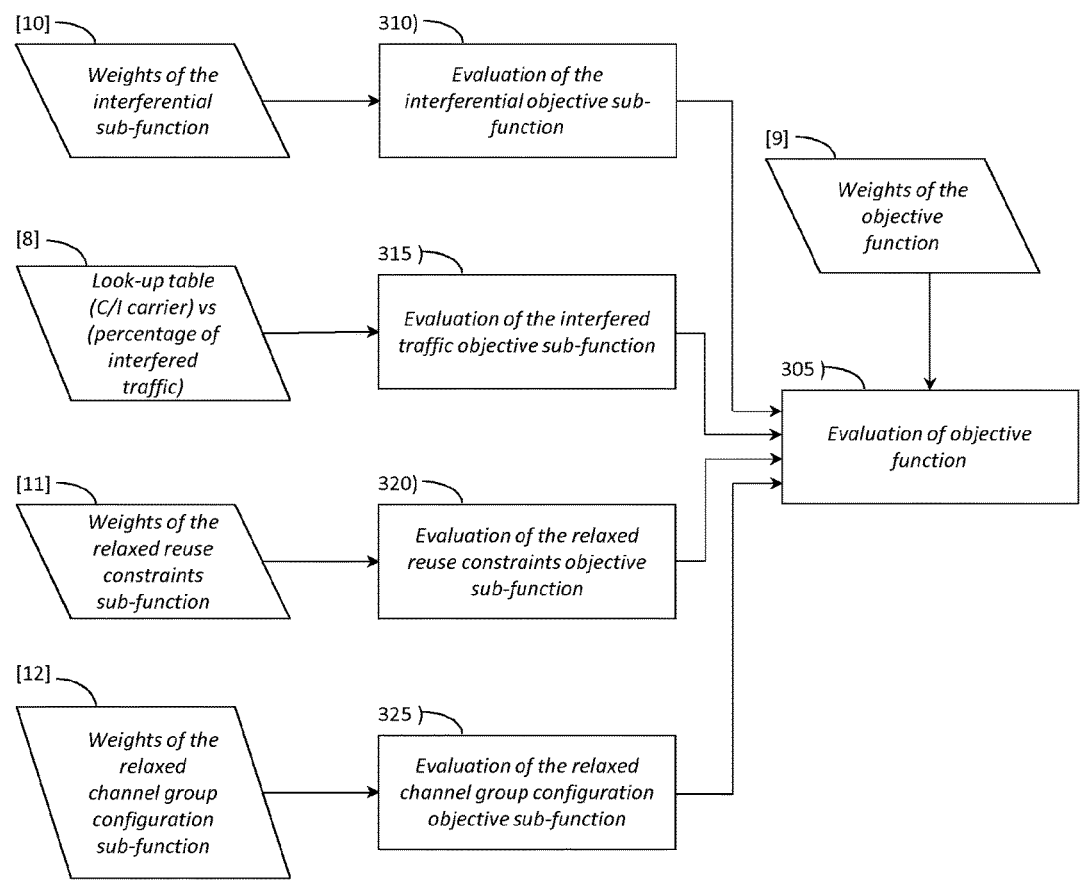
FIG. 3 is an activity flow diagram schematizing some actions of a method devoted to the evaluation of an objective function according to an embodiment of the present invention.

Based on the input data [8] to [12] previously described and on the interferential levels estimation [13] to [18] described above, the objective function can evaluated as described herebelow, with reference to the actions flow diagram depicted in FIG. 3.

As schematized by computation block 310, the interferential objective sub-function $Fo^{int}$ is evaluated taking into account the interferential levels characterizing the current frequency plan 205 and the weights [10]. In particular, the interferential objective sub-function $Fo^{int}$ can be calculated as follows:

$$F_O^{int} = W_{int}^{npss,2G} \cdot \sum_{i=1}^{N_{2G}} \sum_{j=1}^{P_i} x_{ij} + W_{int}^{npss,extra-2G} \cdot \sum_{k=1}^{N_{extra-2G}} y_k + \quad [19]$$

$$W_{int}^{I/C\,avg} \cdot \frac{\sum_{i=1}^{N_{2G}} \sum_{j=1}^{P_i} \left(\frac{I}{C}\right)_{ij}}{\sum_{i=1}^{N_{2G}} p_i} + W_{int}^{I/C\,max} \cdot \max_{\substack{i \in [1, N_{2G}] \\ j \in [1, p_i]}} \left(\frac{I}{C}\right)_{ij}$$

where:
- $x_{ij}$ is equal to 1 if the j-th carrier of the i-th 2G cell is characterized by a ratio of useful signal to the total interfering signal below a predefined threshold (e.g. 9 dB), otherwise it is equal to 0
- $N_{2G}$ is the number of cell belonging to the 2G network
- $y_k$ is equal to 1 if k-th extra-2G cell is characterized by a ratio of useful signal to the total interfering signal below a predefined threshold (different by the analogue threshold used for 2G carriers), otherwise it is equal to 0 and
- $N_{extra-2G}$ is the number of cell belonging the extra-2G network.

As schematized by computation block 315, the interfered carried traffic objective sub-function $Fo^{traff}$ is evaluated taking into account the interferential levels characterizing the current frequency plan and using the look-up table [8] to obtain the weights. In particular, the interfered carried traffic objective sub-function $Fo^{traff}$ can be calculated as follows:

$$F_O^{traff} = \sum_{i=1}^{N_{2G}} \sum_{j=1}^{p_i} \varphi_k^\% \left[ \left( \frac{I}{C} \right)_{ij} \right] \cdot \frac{T_i}{p_i} \quad [20]$$

where:
- $T_i$ corresponds to the traffic carried by the i-th 2G cell.

As schematized by computation block 320, the relaxed reuse constraints objective sub-function sub-function $Fo^{rc}$ can be evaluated as follows, exploiting the weights [11]:

$$F_O^{rc} = W_{rc}^{cell} \cdot \sum_{i=1}^{N_{2G}} n_i^{cell} + W_{rc}^{site} \cdot \sum_{i=1}^{N_{2G}} \sum_{\substack{j=1 \\ j \neq i}}^{N_{2G}} n_{ij}^{site} + \quad [21]$$

$$W_{rc}^{adj1} \cdot \sum_{i=1}^{N_{2G}} \sum_{\substack{j=1 \\ j \neq i}}^{N_{2G}} n_{ij}^{adj1} + W_{rc}^{adj2} \cdot \sum_{i=1}^{N_{2G}} \sum_{\substack{j=1 \\ j \neq i}}^{N_{2G}} n_{ij}^{adj2}$$

where:
- $n_i^{cell}$ is the number of cell constraints relaxed by the i-th 2G cell site
- $n_{ij}^{site}$ is the number of site constraints relaxed by the i-th and j-th 2G cells one towards the other
- $n_{ij}^{adj1}$ is the number of adjacency constraints with minimum distance equal to 1 relaxed by the i-th and j-th 2G cells one towards the other and
- $n_{ij}^{adj2}$ is the number of adjacency constraints with minimum distance equal to 2 relaxed by the i-th and j-th 2G cells one towards the other.

As schematized by computation block 325, the relaxed channel group configuration objective sub-function $Fo^{cgc}$ can be evaluated as follows, exploiting the weights [12]:

$$F_O^{cgc} = W_{cgc}^{0P} \cdot \sum_{i=1}^{N_{2G}} n_i^{0P} + W_{cgc}^{1P} \cdot \sum_{i=1}^{N_{2G}} n_i^{1P} + W_{cgc}^{2P} \cdot \sum_{i=1}^{N_{2G}} n_i^{2P} \quad [22]$$

where:
- $n_i^{0P}$ is the number of sub-optimal 0P channel group configuration due to the ARFCNs assigned to the i-th 2G cell
- $n_i^{1P}$ is the number of sub-optimal 1P channel group configuration due to the ARFCNs assigned to the i-th 2G cell
- $n_i^{2P}$ is the number of sub-optimal 2P channel group configuration due to the ARFCNs assigned to the i-th 2G cell.

Finally, as schematized by computation block 305, the (total) objective function $F_O$ can be evaluated as follows, exploiting the weights [9]:

$$F_O = W_{int} \cdot F_O^{int} + W_{traff} \cdot F_O^{traff} + W_{rc} \cdot F_O^{rc} + W_{cgc} \cdot F_O^{cgc} \quad [23]$$

The objective function $F_O$ is used to lead the frequency assignment algorithm to the definition of a new, satisfying 2G frequency plan starting from the current 2G frequency plan 205, taking into account both the interferential conditions of the 2G and extra-2G networks and other aspects (e.g. reuse constraints and/or interfered carried traffic and/or frequency hopping channel group configuration) that should be considered in order to define in an efficient way the final frequency plan.

Figure 4:
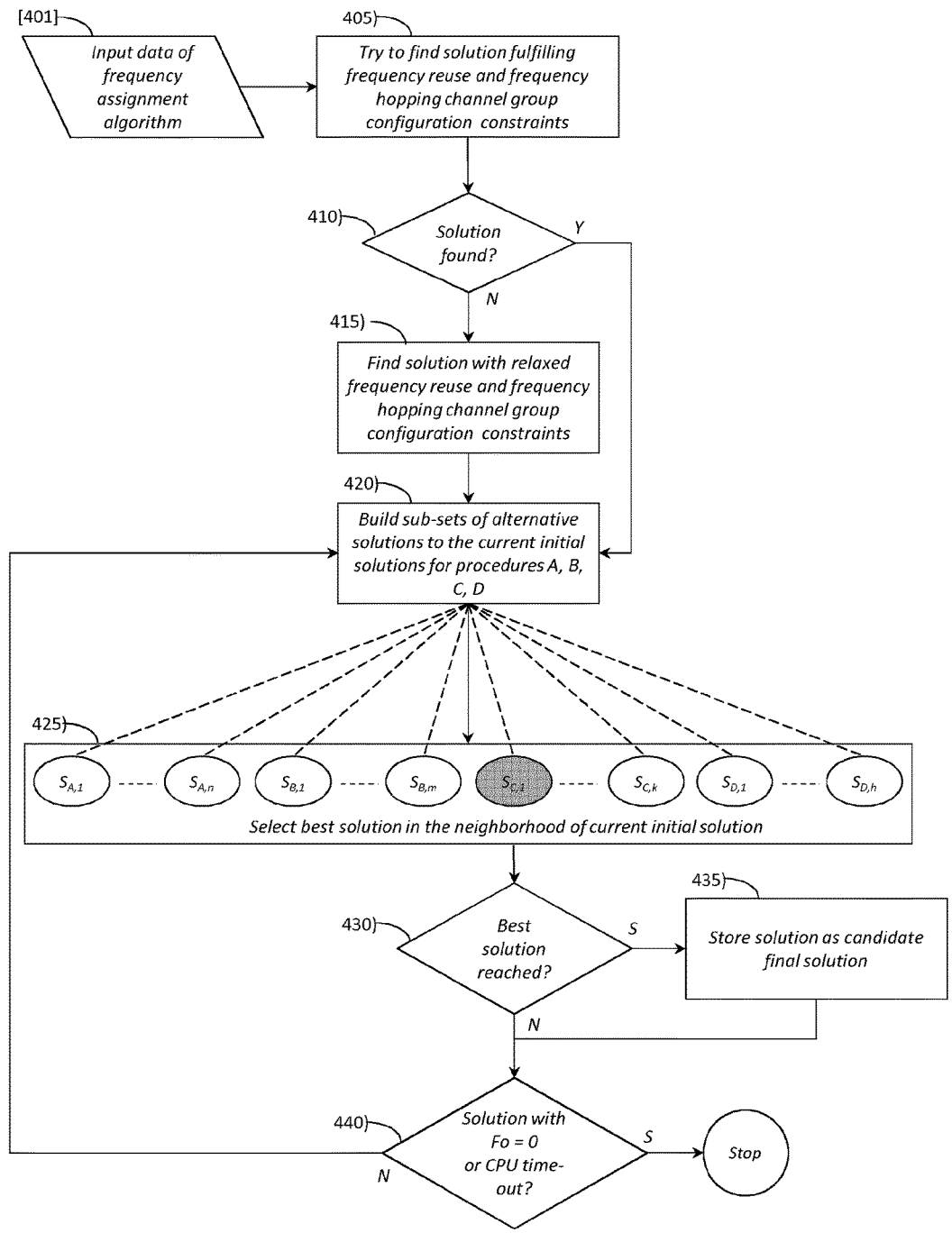
FIG. 4 is a schematic flowchart showing the main steps of a frequency assignment algorithm according to an embodiment of the present invention.

FIG. 4 schematically shows the main steps of a frequency assignment algorithm according to an embodiment of the present invention.

In FIG. 4, block 401 schematizes all the input data of the frequency assignment algorithm, namely the input data [1] to [7] shown in FIG. 2 and discussed in the foregoing.

Based on the input data 401, in block 405 the frequency assignment algorithm tries to find an initial solution to the 2G network frequency assignment problem, i.e., the algorithm tries to build an initial frequency plan for the 2G network. In this stage, the algorithm tries to find an initial solution which fulfills the constraints in terms of frequency reuse and frequency hopping channel group configuration.

Then, in block 410 the algorithm assesses whether, in block 405, a solution fulfilling the constraints in terms of frequency reuse and frequency hopping channel group configuration could be found.

It is pointed out that an initial solution fulfilling the constraints of frequency reuse and frequency hopping channel group configuration could not be a priori obtainable, since such constraints are several and severe (for example, there are constraints configurations that can not be fulfilled a priori, given the number and the specific values of the available frequencies for the definition of the frequency plan).

If, in block 410, it is assessed that, in block 405, a solution satisfying the constraints has been found (exit branch Y of block 410), the operation proceeds to block 420, otherwise (exit branch N of block 410), the operation passes to block 415, where the algorithm builds a solution with relaxed frequency reuse and frequency hopping channel group configuration constraints.

It is pointed out that, differently from the attempt of finding a solution satisfying the above-mentioned constraints, a solution with relaxed frequency reuse and frequency hopping channel group configuration constraints can in principle always be obtained, because the algorithm, although trying to fulfil the constraints, can disregard one or more of them.

In block 420, taken the solution found in block 405 or in block 415 as the current solution (corresponding to the current 2G frequency plan 205 of FIG. 2), the algorithm builds a number of alternative solutions in the neighbourhood of such current solution (where "in the neighbourhood" is to be intended in a space of solutions having a given metric, defined by the objective function discussed above). The alternative solutions are grouped in sub-sets of alternative solutions, which are built according to a number of, e.g. four, criteria related to respective criticalities of the current initial solution. For example, different (e.g., four) classes (A, B, C, D) of criticalities of a generic initial solution can be defined (e.g., unsatisfactory interference levels for one or more 2G network carrier, 2G network carriers and/or extra-2G network carriers with associated C/I below a minimum quality threshold, 2G network carriers not satisfying the frequency reuse constraints or the frequency hopping channel group constraints). For each class of criticalities, a different action is undertaken for modifying the current solution and obtain a corresponding alternative solution.

Then, in block 425 the algorithm selects the best solution among the alternative solutions built in the current round in the neighbourhood of the current solution. To do this, the algorithm evaluates the various alternative solutions by means of their respective value of the objective function $F_O$. A "new current solution" is selected, among the number of alternative solutions, having the best value of objective function among the other alternative solutions, e.g. the lowest value of objective function (or, alternatively, the highest value of objective function—this depending on how the objective function is defined). The alternative solution having the best value of objective function among the other alternative solutions can be selected as the new current solution even if its value of the objective function is not better than the current solution starting from which the alternative solutions have been built.

As schematized by blocks 430 and 435, the new current solution selected in block 425 is stored as the candidate final solution if it is the best solution (i.e., the solution having the lowest value—or highest value, depending on how the objective function is defined) of objective function compared to all the previously new current solutions evaluated and selected by the algorithm during its exploration of the space of solutions. This means, that in the first round the alternative solution having the best value of objective function is stored as the candidate final solution: if, in the successive rounds, another solution is found having a better value of objective function, such another solution is stored as candidate final solution.

As schematized in block 440, the algorithm iterates the above procedure, each time starting from the new current solution as the initial solution for the construction of the alternative solutions in the space of solutions, and stops when either a solution is found having an objective function value below, or above, a given threshold value, e.g. an objective function equal to 0, or when the processing time exceeds a timeout.

When the algorithm comes to the end, the last candidate solution stored is taken as the final solution of the frequency assignment problem to the 2G network.

Thanks to the described embodiment, it is possible to define a frequency plan for one of co-existing different mobile communication networks, for example a 2G network like a 900 MHz GSM network or 1800 MHz GSM-DCS network, taking into account the co-existence of such 2G network with different radio mobile telecommunications networks, based on different technologies, e.g. UMTS/HSDPA operating at 900 MHz or LTE or LTE-A operating at 1800 MHz.

The invention claimed is:

1. A method of assigning radio frequencies to base stations of a first radio telecommunications network operating in a first radio frequency band and co-existing with at least a second radio telecommunications network operating in a second radio frequency band at least partially overlapping the first radio frequency band, the method comprising:
1—providing:
   a) a description of the mutual interference of the base stations of the first radio telecommunications network;
   b) a description of the interference caused by the second radio telecommunications network to the base stations of the first radio telecommunications network;
   c) a description of the interference caused by the base stations of the first radio telecommunications network to the second radio telecommunications network;
   d) a description of the mutual interference of base stations of the second radio telecommunications network,
   wherein said providing a), b), c) and d) is based on simulations of electromagnetic field propagation;
2—defining a cost function for quantitatively evaluating a radio frequency assignment plan for the base stations of the first radio telecommunications network;
3—based on the provided descriptions a), b), c) and d), calculating an initial radio frequencies assignment plan for the base stations of the first radio telecommunications network;
4—calculating at least one alternative radio frequency assignment plan starting from the initial radio frequency assignment plan;
5—calculating a value of the cost function for the alternative radio frequency assignment plan;
6—selecting as radio frequency assignment plan for the base stations of the first radio telecommunications network one of the alternative radio frequency assignment plans based on the values of the cost function, and
7—assigning to the base stations of the first radio telecommunications network frequencies in accordance with the radio frequency assignment plan selected in step 6.

2. The method of claim 1, wherein said providing:
a) a description of the mutual interference of the base stations of the first radio telecommunications network comprises providing a description in the form of a matrix whose generic matrix element is indicative of a ratio of the useful signal to the interfering signal associated with a carrier of an i-th base station of the first radio telecommunications network when a co-channel frequency is assigned to a carrier of a j-th base station of the first radio telecommunications network.

3. The method of claim 1, wherein said providing b) a description of the interference caused by the second radio telecommunications network to the base stations of the first radio telecommunications network comprises providing a description in the form of an array whose generic array element is indicative of a ratio of the useful signal to the interfering signal associated with a carrier of an h-th base station of the first radio telecommunications network due to the second radio telecommunications network as a whole.

4. The method of claim 1, wherein said providing c) a description of the
interference caused by the base stations of the first radio telecommunications network to the second radio telecommunications network comprises providing a description in the form of a matrix whose generic matrix element is indicative of a ratio of the useful signal to the interfering signal associated with a m-th base station of the second radio telecommunications network due to a single carrier of a n-th base station of the first radio telecommunications network.

5. The method of claim 1, wherein said providing d) a description of the
mutual interference of base stations of the second radio telecommunications network
comprises providing a description in the form of an array whose generic array element is indicative of a ratio of the useful signal to the interfering signal associated with a k-th base station of the second radio telecommunications network due to the whole second radio telecommunications network.

6. The method of claim 1, wherein the second radio telecommunications network is a wide-band carrier network.

7. The method of claim 6, wherein said cost function is defined as a weighted combination of two or more sub-functions, particularly a first sub-function related to interferential conditions, a second sub-function related to an interfered traffic, a third subfunction related to frequency reuse constraints and a fourth sub-function related to a channel group configuration.

8. The method of claim 7, wherein the first sub-function related to interferential conditions takes account of a number of carriers of the second radio telecommunications network that, based on said description of the interference caused by the base stations of the first radio telecommunications network to the second radio telecommunications network, are below a predefined threshold of ratio of useful signal to total interfering signal.

9. The method of claim 1, wherein said calculating an initial radio frequencies assignment plan for the base stations of the first radio telecommunications network comprises trying to find a radio frequencies assignment plan that fulfils radio frequency reuse constraints and radio frequency hopping channel group constraints.

10. The method of claim 9, wherein said calculating an initial radio frequencies assignment plan for the base stations of the first radio telecommunications network comprises, in case a radio frequencies assignment plan that fulfils radio frequency reuse constraints and radio frequency hopping channel group constraints can not be found, calculating a radio frequencies assignment plan for the base stations of the first radio telecommunications network with relaxed radio frequency reuse constraints and radio frequency hopping channel group constraints.

11. The method of claim 1, wherein said steps 4 and 5 comprises calculating a plurality of alternative radio frequencies assignment plans and calculating a value of the cost function for each alternative radio frequency assignment plan of said plurality, and selecting one among said plurality of alternative radio frequency assignment plan as a candidate radio frequency assignment plan based on the respective value of the cost function.

12. The method of claim 1, comprising repeating at least once steps 4, 5 and 6, wherein, for the first and subsequent repetitions, the selected radio frequency assignment plan selected in step 7 of the preceding execution of steps 4-6 is taken as initial radio frequency assignment plan.

13. A system configured for carrying out the method of claim 1.

* * * * *